(No Model.)

E. J. KNAPP.
HOSE COUPLING.

No. 574,067. Patented Dec. 29, 1896.

WITNESSES:
Maude C. Cooke
Charles N. Marvin

INVENTOR
Edward J. Knapp.
BY
Smith & Brinson
ATTORNEYS.

UNITED STATES PATENT OFFICE.

EDWARD J. KNAPP, OF SYRACUSE, NEW YORK, ASSIGNOR TO CHARLES UMBRECHT, TRUSTEE, OF SAME PLACE.

HOSE-COUPLING.

SPECIFICATION forming part of Letters Patent No. 574,067, dated December 29, 1896.

Application filed March 12, 1896. Serial No. 582,870. (No model.)

*To all whom it may concern:*

Be it known that I, EDWARD J. KNAPP, of Syracuse, in the county of Onondaga, in the State of New York, have invented new and useful Improvements in Hose-Couplings, of which the following, taken in connection with the accompanying drawings, is a full, clear, and exact description.

My invention relates to hose-couplings, and particularly to that class which are designed to make a steam-tight joint between the sections thereof.

My object is to produce a coupling of detachable sections, counterparts of each other, each provided with an angular interior passage opening through a gasket-ring packing, which are adapted to be coupled and create a continuous passage, bringing two gasket-faces together, and to interlock, so that said sections will stand at an angle to each other, means being also provided to produce lateral pressure upon each section in line with the center of each of said gaskets, in order to squeeze said gaskets together and thus insure the tightness of the joint, and also that when longitudinal strain is applied to the hose said sections will be thereby unlocked and fall apart.

My invention consists in the novel features of construction and novel combinations of elements hereinafter described and which are specifically set forth in the claims hereunto annexed.

It is constructed as follows, reference being had to the accompanying drawings, in which—

Figure 1:
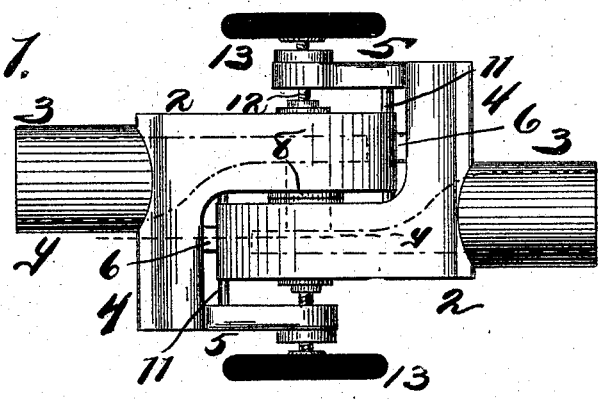
Figure 2:
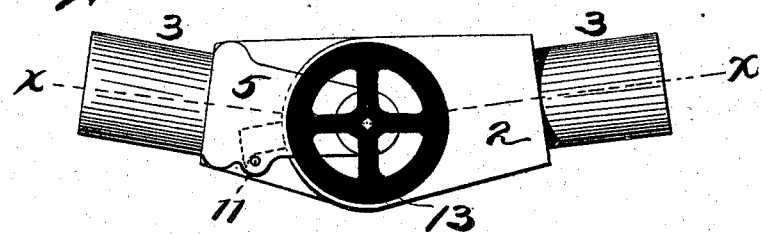
Figure 3:
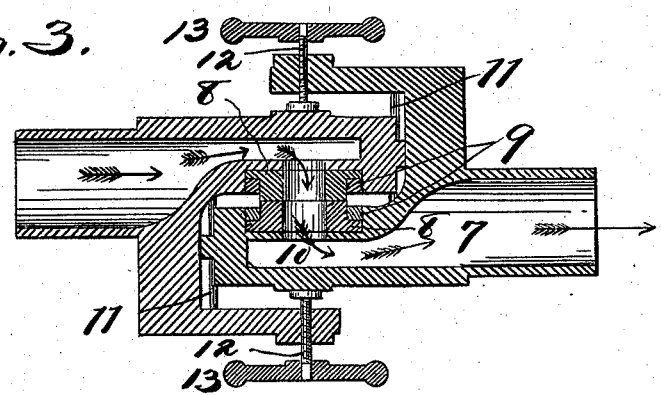
Figure 4:
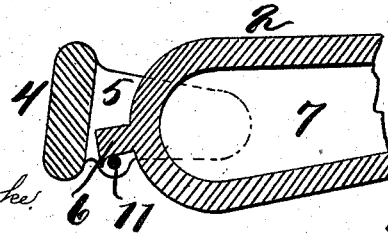

Figure 1 is a bottom plan of the coupling. Fig. 2 is a side elevation thereof. Fig. 3 is a transverse section thereof on line *x x* in Fig. 2. Fig. 4 is a sectional detail on line *y* in Fig. 1, showing the interlocking hook and one section in engagement with the wire of the other.

As each section is the exact counterpart of the other, only one will be described. It consists of a suitable body 2, provided with a shank 3, an offset 4, an arm 5 thereon, and a more or less hooked lug 6, projecting from the inner end of the body. The body and shank are cored out, creating a passage 7, and the inner end is flattened, so that the arm 5 is parallel thereto, and this flat inner face is recessed to receive a gasket 8, flanged substantially as shown, and 9 is a keeper-ring screwed into said recess and bearing upon said gasket-flange, to hold the gasket, leaving its outer face projecting above the adjacent body.

The gasket is a ring, its central opening coinciding with an opening 10 through said body at the bottom of said recess, which creates an angular extension of the passage 7. Between each arm 5 and the body a wire 11 is secured, substantially as shown. In each arm 5 a threaded presser-rod 12 is mounted, having a hand-wheel 13.

When two sections are placed together in coupling them, the hook of one will lock over the wire of the other, the faces of the two gaskets will meet, and then by operating one or both of said presser-rods their faces will be forced tightly together.

It will be seen that the interlocking operates to permit the sections to hang at an angle to each other, and then when a strain draws them to substantially a straight line they become unlocked and are readily drawn apart.

What I claim as my invention, and desire to secure by Letters Patent, is—

1. In a hose-coupling, the body 2, provided with a shank 3, offset 4, arm 5, and a hooked lug, combined with a flanged gasket, a keeper-ring 9, screwed into the body; the wires 11, to engage with the hooked lugs, said wires being of a length to permit lateral movement of the hooks to allow the coupling members to be clamped and the screw-rods 12, passing through the arms and bearing against the bodies, substantially as shown.

2. A hose-coupling consisting of two detachably-connected sections, recessed in their meeting faces, exteriorly-flanged ring-gaskets in the recesses, ring-nuts to secure the gaskets in place, arms parallel with the faces, wires extending from the faces to the arms, lugs on each section for engaging the wires for holding the sections, angularly-connected screws passing through the arms and bearing against raised portions on the outer faces of the sections, whereby when the sections are submitted to longitudinal strains the wires will give or bend until the screws slip from the raised portions to detach the sections, substantially as described.

In witness whereof I have hereunto set my hand this 9th day of March, 1896.

EDW. J. KNAPP.

In presence of—
MAUDE E. COOKE,
HOWARD P. DENISON.